(No Model.)

E. PECKHAM & E. LAASS.
VEHICLE AXLE.

No. 378,058. Patented Feb. 14, 1888.

WITNESSES:
A. F. Walz
C. Bendixon

INVENTORS:
Edgar Peckham & Emil Laass
BY
Dudly, Laass & Dudl
ATTORNEYS.

UNITED STATES PATENT OFFICE.

EDGAR PECKHAM AND EMIL LAASS, OF SYRACUSE, NEW YORK; SAID LAASS ASSIGNOR TO HIMSELF AND CHARLES H. DUELL, OF SAME PLACE.

VEHICLE-AXLE.

SPECIFICATION forming part of Letters Patent No. 378,058, dated February 14, 1888.

Application filed January 12, 1887. Serial No. 224,097. (No model.)

*To all whom it may concern:*

Be it known that we, EDGAR PECKHAM and EMIL LAASS, of Syracuse, in the county of Onondaga, in the State of New York, have invented new and useful Improvements in Vehicle-Axles, of which the following, taken in connection with the accompanying drawings, is a full, clear, and exact description.

The customary method of manufacturing metallic vehicle-axles is to heat the axle-blank (usually to a welding heat) and draw or roll or swage it to the proper size and shape and requisite taper at the spindles. The spindles are then usually turned in a lathe or milling-machine, so as to make them perfectly round and smooth and of the exact size to fit to the boxes. This method of producing an axle with true machine-finished spindles is objectionable, in that the hot swaging or rolling makes the surface of the spindles soft and not serviceable, and the process of turning the surfaces in the lathe or milling-machine cuts the grain of the metal, and consequently weakens to a greater or less extent the spindles. When a harder wearing-surface is desired, the only method heretofore resorted to for producing such surfaces was by the usual and well-known process of case-hardening the spindles. This, however, is liable to render the surface brittle, and consequently impair the durability of the same.

The object of our invention is to overcome the aforesaid defects and to produce a metallic axle with spindles provided with smooth hard wearing-surfaces having the grain of the metal not only intact, but also condensed, and thus possessing superior capacity of resisting friction and abrasion, and also corrosion.

In describing our invention reference is to be had to the annexed drawings, in which—

Figure 1:
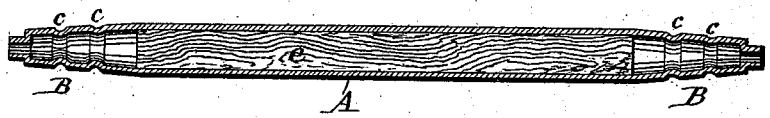
Figure 3:
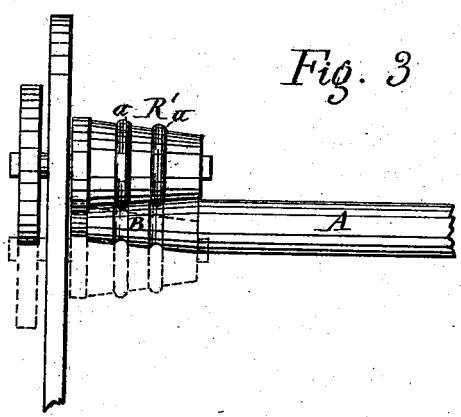
Figure 2:
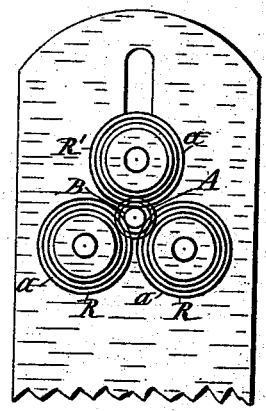
Figure 4:
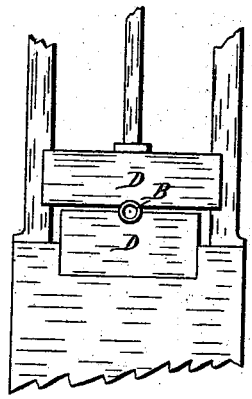

Figure 1 is a longitudinal section of the vehicle-axle embodying our improvements. Fig. 2 is a face view of a set of rollers adapted for compressing the spindles of the axle to the desired taper and for forming circumferential grooves therein. Fig. 3 is a side view of the same, and Fig. 4 illustrates an exemplification of the means of planishing the axle-spindles.

A represents the axle. B B are the spindles of the same.

The process of forming our improved axles is as follows: The blank from which the axle is to be formed may be either solid or hollow and composed either of steel or iron. The spindles B B we taper, in the usual manner, one at a time by heating the end portion of the blank to a welding or swaging heat and tapering the same by shaping it under a hammer or dies or a set of rotary pressure-rollers, R R R', as represented in Figs. 2 and 3 of the drawings, one of said rollers, R', being on a laterally-movable shaft, which allows said roller to be moved sufficiently from the other rollers to permit of introducing the end of the axle-blank between the rollers, as aforesaid. Said rollers are slightly tapered to produce a correspondingly-tapering spindle on the end of the blank.

If desired, the rollers may be provided with circumferential ribs $a\,a$, to produce corresponding circumferential grooves, $c\,c$, in the spindles, which grooves serve to retain a certain amount of lubricant around the central portion of the spindle and prevent waste of lubricant through the ends of the wheel-hub mounted on said spindle. After the spindles have been formed on the blank, as above stated, either smooth or grooved, they are to be freed from scale by subjecting them to an acid bath, and then we finish the spindles by planishing or cold-rolling them—*i. e.*, subjecting the surfaces thereof to the impingement or blows of a hard smooth-faced hammer or dies or rolls—the axle and its spindles being kept cold during said planishing process. This planishing or cold-rolling process imparts smooth, hard, and condensed surfaces on the spindles without in the least weakening or otherwise injuriously affecting the grain of the metal below the surface of the spindles, and instead of cutting the grain of the metal at the surface we condense the metal in a manner that cannot be accomplished by hammering, rolling, or swaging the metal under a red heat, and while we obtain a hard and smooth wearing-surface on the spindles we at the same time preserve the toughness of the body of the metal. In fact, axle-spindles finished under our improved process are superior to those of the ordinary construction in points of strength and durability and capacity of reducing and resisting friction and corrosion.

We are aware that axle-blanks have been finished by reheating, hammering while still heated, and finally polishing in the usual manner, and this we do not claim as our invention, which consists, essentially, in finishing the blanks by cold-rolling, so as to harden and polish the blanks at one and the same operation.

Having described our invention, what we claim as new, and desire to secure by Letters Patent, is—

1. As an improved article of manufacture, a vehicle-axle having planished end portions presenting smooth, condensed, and hardened surfaces, substantially as specified.

2. The process of finishing the spindles or journals of vehicle-axles, consisting in subjecting said spindles while cold to the strokes or impingement of hard smooth-faced planishing tools or dies, and thereby smoothing, condensing, and hardening the surfaces of said spindles or journals, substantially as set forth.

In testimony whereof we have hereunto signed our names and affixed our seals, in the presence of two attesting witnesses, at Syracuse, in the county of Onondaga, in the State of New York, this 10th day of January, 1887.

EDGAR PECKHAM. [L. S.]
EMIL LAASS. [L. S.]

Witnesses:
H. P. DENISON,
C. BENDIXON.